United States Patent
Nabeshima

(10) Patent No.: US 6,527,474 B2
(45) Date of Patent: Mar. 4, 2003

(54) PAVEMENT DRAIN

(75) Inventor: Nobuya Nabeshima, Saitama (JP)

(73) Assignee: Stella Corporation, Tokyo (JP)

( * ) Notice: Subject to any disclaimer, the term of this patent is extended or adjusted under 35 U.S.C. 154(b) by 0 days.

(21) Appl. No.: 09/843,862

(22) Filed: Apr. 30, 2001

(65) Prior Publication Data
US 2002/0159833 A1 Oct. 31, 2002

(51) Int. Cl.[7] .............. E01F 5/00; E03F 1/00
(52) U.S. Cl. .............. 404/2; 405/43; 405/36
(58) Field of Search .............. 405/36, 51, 43, 405/44, 50; 404/2–5; 52/169.5; 267/286, 289, 166, 167, 168

(56) References Cited

U.S. PATENT DOCUMENTS

| | | | |
|---|---|---|---|
| 3,965,686 A | * | 6/1976 | Saito et al. .............. 405/43 |
| 4,889,327 A | * | 12/1989 | Seyler .............. 267/168 |
| 5,980,740 A | * | 11/1999 | Harms et al. .............. 404/4 |
| 6,220,586 B1 | * | 4/2001 | Pavlin et al. .............. 267/168 |

FOREIGN PATENT DOCUMENTS

| | | | |
|---|---|---|---|
| JP | 55-59736 | | 4/1980 |
| JP | 363268810 | * | 11/1988 |
| JP | 08-081993 | | 3/1996 |
| JP | 408093041 | * | 4/1996 |
| JP | 3055316 | | 10/1998 |
| JP | 411247113 | * | 9/1999 |
| JP | 2000-017601 | | 1/2000 |
| JP | 3068-269 | | 2/2000 |
| JP | 2000257014 | * | 9/2000 |
| JP | 200120363 | * | 1/2001 |
| JP | 2001173075 | * | 6/2001 |

* cited by examiner

Primary Examiner—Frederick L. Lagman
(74) Attorney, Agent, or Firm—Oblon, Spivak, McClelland, Maier & Neustadt, P.C.

(57) ABSTRACT

A pavement drain includes a spring coil strap formed in a continuous spiral fashion and composed of a plurality of linear bodies of synthetic resin that are arranged in parallel. The adjacent linear bodies are joined together at side parts thereof having a height at least one fourth the height of the linear bodies.

8 Claims, 2 Drawing Sheets

PAVEMENT DRAIN

BACKGROUND OF THE INVENTION

1. Field of the Invention

The present invention relates to a plastic pavement drain for discharging to a catch basin water penetrating into a pavement.

2. Description of the Prior Art

Conventional water-permeable or water-dischargeable pavements can only allow water to penetrate thereinto. Recently, however, a multifunctional pavement has been proposed and has come into the spotlight because it can prevent water smoking or hydroplaning from occurring, shorten an automobile's stopping distance in the rain, reduce headlight reflection in the rain or at night, absorb and reduce noise, and lower the roadbed temperature.

Water penetrating into a multifunctional pavement flows into a drain and is discharged to a catch basin. This drain is required to have gaps through which water enters the drain and a continuous space through which the entering water flows, and exhibit rigidity high enough to withstand a load exerted thereon when a road having the drain embedded is solidified and a load exerted on the road by automobiles etc.

A drain can be made capable of withstanding such loads by making it from a porous metal pipe. However, metal drainpipes are expensive and susceptible to corrosion over long-time use. When a road is dug up using an excavator for repairing the corroded metal drainpipes, the excavator comes into contact with the drainpipes, resulting in breakage of the excavator and/or drainpipes. The broken drainpipes cannot be reused and give rise to a pollution problem.

JP-A HEI 10-38510 discloses a drain comprising a metal spring pipe and a knitted fiber layer that covers the metal spring pipe. This drain is produced by preparing a spring pipe and knitting the spring pipe and a knitted fiber layer together. Thus, the producing method is complicated. In addition, since the spring pipes are made from metal, the problems of excavator or pipe breakage, impossibility of reusing the spring pipes and pollution have not yet been solved.

JP-A 2000-11924 discloses a net drain of knitted synthetic resin fibers. Since the resin drains can be recycled together with paving material, they do not give rise to a pollution problem. However, they are low in compression strength.

Technologies have recently been developed for enhancing the compression strength and durability of road paving materials. Water-permeable pavement is used not only for sidewalks but also for roads. However, synthetic resin drains of the aforementioned constitution cannot withstand the mechanical load exerted (by a macadam roller) when a road is macadamized and the surface thereof is solidified, are liable to be crushed. Furthermore, the drains do not readily maintain their predetermined original shape over a long period of time when used in thruways where there is much traffic.

The present invention has been proposed in view of the above. One object thereof is to provide a pavement drain of synthetic resin that is inexpensive and easy to produce and exhibits compression strength high enough to withstand a load exerted on driveways where there is much traffic.

Another object of the invention is to provide a pavement drain that is excellent in durability, easy to install and capable of being reused, and produces no pollution.

SUMMARY OF THE INVENTION

To attain the above objects, the present invention provides a pavement drain comprising a spring coil strap formed in a continuous spiral fashion and composed of a plurality of linear bodies of synthetic resin that are arranged in parallel, adjacent linear bodies being connected to each other at side parts thereof having a height at least one fourth a height of the linear bodies.

The plurality of linear bodies is two or three linear bodies.

The spiral drain comprising a spring coil strap composed of a plurality of linear bodies arranged in parallel and connected together receives pressure on its surface and exhibits very high compression strength. For this reason, it can sufficiently withstand a load exerted by a macadam roller used when the surface of a road is solidified after macadamization, retain its predetermined original shape over a long period of time, and maintain its water-guiding function.

Since the drain and the paving material are both petroleum products, the drain can be recycled together with the paving material without being separately recovered, when the road is to be repaired. Therefore, no pollution problem arises. Furthermore, since the drain is made from synthetic resin, it is easy to cut, resulting in no possibility of the drain entangling in or marring a cutting machine.

The above and other objects, features and advantages will become apparent from the description given hereinbelow with reference to the accompanying drawings.

DESCRIPTION OF THE PREFERRED EMBODIMENTS

Figure 1:
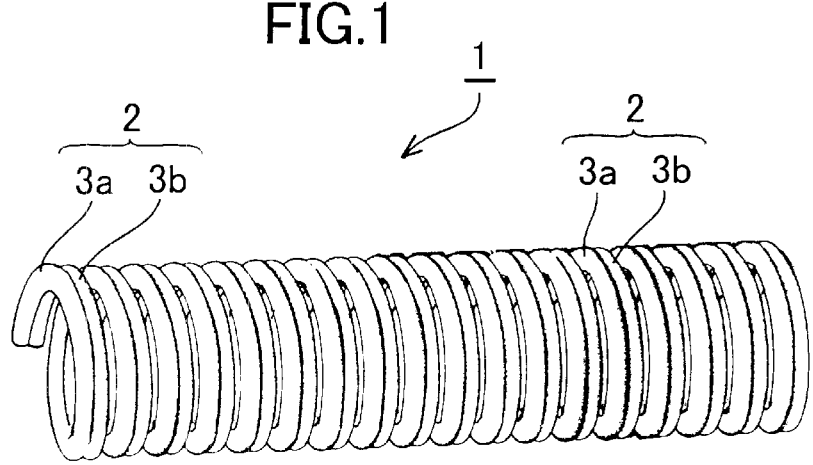
FIG. 1 is a perspective view showing a first embodiment of a strap constituting a pavement drain according to the present invention.
Figure 2:
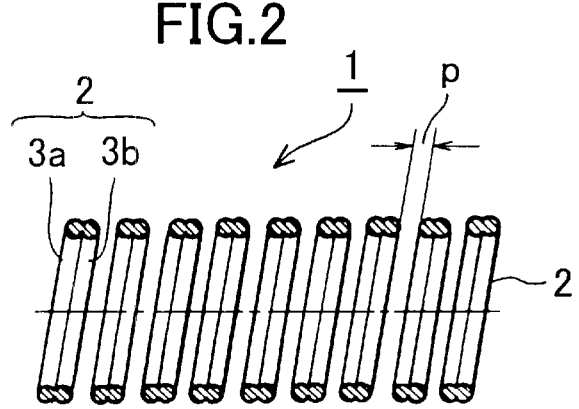
FIG. 2 is a cross section of the pavement drain.
Figure 3:
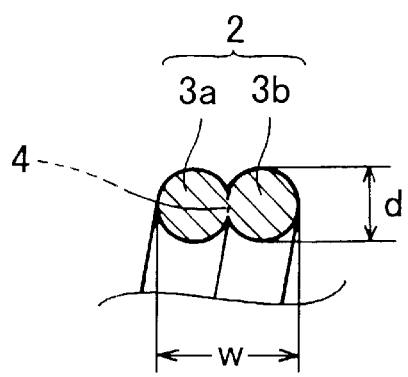
FIG. 3 is an enlarged cross section showing the principal part of the pavement drain.

FIGS. 1 to 3 show a first embodiment of a pavement drain 1 according to the present invention. The pavement drain 1 comprises a spring coil strap 2 formed in a continuous spiral fashion and composed of linear bodies 3a and 3b made of synthetic resin that are arranged in parallel and connected together at side parts thereof having a height at least one fourth the height of the linear bodies. Reference numeral 4 in these figures indicates the connection portion.

Any synthetic resin is usable as the material for the drain 1 insofar as it can resist the temperature generated when it is embedded in the paving material. Examples of usable synthetic resins include polyester, polypropylene and polyacetal. A reinforcing agent, such as glass fibers or carbon fibers, may be added in a suitable amount to the synthetic resin material in order to heighten the rigidity of the drain being produced.

The spring coil drain 1 is molded from the aforementioned synthetic resin using a known extruder.

The diameter d of the linear bodies 3a and 3b varies depending on the diameter of the drain 1 being produced, but is generally in the range of 1.0 to 10.0 mm. The cross-sectional shape of the linear bodies is not limited to a circle and may be an oval or rectangular shape.

The linear bodies 3a and 3b constituting the strap 2 are required to be connected together at their respective side parts having a height at least one fourth the height or diameter d of the linear bodies. As a result, the strap 2 exhibits compression strength much higher than the sum of the compression strength of two linear bodies. When the height of the connection portion 4 is less than one fourth the diameter d of the linear bodies, the compression strength of the strap is substantially the same as that of the linear bodies.

For example, the width w of the strap 2 is in the range of 4.5 to 5.5 mm when it is composed of two linear bodies having a height or diameter d of 2.5 mm and in the range of 5.5 to 6.5 mm when it is composed of two linear bodies having a height or diameter d of 3.2 mm.

It sufficed for the pitch p of adjacent coils of the strap 2 to be in the range of 1.0 to 3.0 mm. With this pitch, the drain can exhibit sufficient compression strength, there is no possibility of paving material entering the drain via the pitch gaps when the drain is embedded in the paving material, and water penetrating into the paving material can enter the space inside the drain via the pitch gaps and be guided to a catch basin.

In the first embodiment shown in FIGS. 1 to 3, the strap 2 of the drain 1 formed in a continuous spiral fashion is composed of the two linear bodies 3a and 3b connected together. However, a drain enhanced in compression strength can be obtained by constituting a continuous spiral strap 2 of three linear bodies 3a, 3b and 3c as shown by a second embodiment in FIG. 4.

Figure 4:
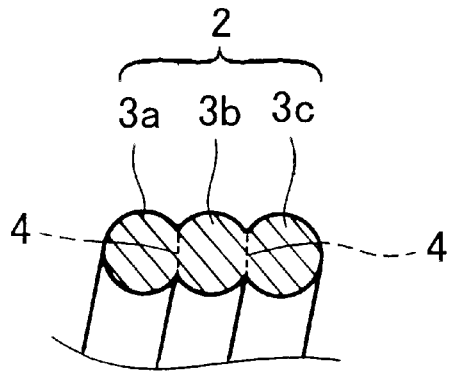
FIG. 4 is a an enlarged cross section showing the principal part of a second embodiment of a strap constituting the pavement drain according to the present invention.
Figure 5:
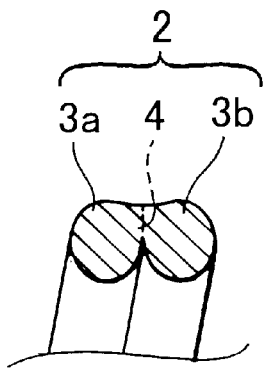
FIG. 5 is an enlarged cross section showing the principal part of a third embodiment of a strap constituting the pavement drain according to the present invention.

In the embodiments shown in FIGS. 3 and 4, the connection portion 4 is positioned at the centers of the adjacent linear bodies 3a and 3b or 3b and 3c. However, this is by no means limitative. The position may be at the upper parts of the adjacent linear bodies as shown by a third embodiment in FIG. 5. In the third embodiment, the surfaces of the adjacent linear bodies at the connection portion 4 are substantially flat.

Figure 6:
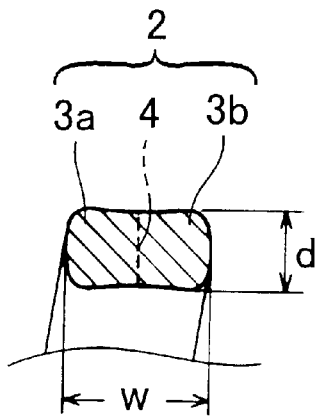
FIG. 6 is an enlarged cross section showing a fourth embodiment of a strap constituting the pavement drain according to the present invention.

FIG. 6 shows a fourth embodiment in which a strap 2 is composed of linear bodies 3a and 3b that have a rectangular cross section and are connected throughout overall side parts thereof. Therefore, the strap 2 has a substantially rectangular cross section. The cross section is preferably 2.0 to 4.0 mm in height d and 4.0 to 8.0 mm in width w. When the outer side surface of the strap 2 is formed in a semicircular shape, the drain has an oval cross section.

The drain of the present invention comprises, as described above, a strap composed of a plurality of linear bodies. Since the pressure of paving material is applied to the surface of the drain, the drain is difficult to deform, maintains its original shape without difficulty, and infallibly maintain its inside space through which water flows.

Spiral drains having outside diameters of 20 mm and 28 mm were produced using polyester straps of two connected linear bodies 3.1 mm in diameter and of two connected linear bodies 3.9 mm in diameter, having widths of 4.7 mm and 6.6 mm, respectively. The pitch p of adjacent coils of each of the drains thus produced was 1.5 mm.

The drains were tested for compression strength in the following manner. The drains were cut to obtain twenty samples each having a length of 10 cm. Each sample was placed on a substrate having a groove 12 mm in width and along the groove, then pressure was applied to the entire sample. The pressure obtained when the height of the sample was lowered by 5 mm was defined as compression strength.

The compression strength of the drains having the outside diameter of 20 mm was 71 to 72 N/mm, and that of the drains having the outside diameter of 28 mm was 73 to 73.5 N/mm.

A spiral drain having an outside diameter of 25 mm and comprising a polyester strap that had a substantially rectangular cross section 3.5 mm in height and 6.6 mm in width as shown in FIG. 6 was tested for compression strength in the same manner as described above. It was 72 to 73 N/mm.

For comparison, a spiral drain comprising a polyester strap composed of a single linear body 3.1 mm in diameter was tested for compression strength in the same manner as described above. It was 20 to 25 N/mm.

The drain of the present invention comprising a strap composed of a plurality of connected linear bodies of synthetic resin receives pressure on its surface. This is why the compression strength is 3.5 times that of the drain molded from a single linear body. The drain of the present invention meets of the compression strength standard for drains used in thruways in Japan.

Synthetic resin drains have been used in sidewalks, tennis courts, etc. where small pressure is applied. By the present invention, however, synthetic resin drains can be buried in roads where there is much traffic. Thus, the present invention provides a reliable drain excellent in pressure resistance and durability. Furthermore, there is no possibility of rust generation resulting from use of a metal drain, of a drain entangling an excavator when a road is dug for repairing, and of pollution occurrence due to impossibility of reusing a drain. Thus, the present invention can economically provide drains with high productivity.

What is claimed is:

1. A pavement drain comprising a spring coil strap formed in a continuous spiral fashion and composed of a plurality of linear bodies of synthetic resin that are arranged in parallel, adjacent linear bodies being connected to each other at side parts thereof having a height at least one fourth a height of the linear bodies.

2. The pavement drain according to claim 1, wherein said plurality of linear bodies is two linear bodies.

3. The pavement drain according to claim 1, wherein said plurality of linear bodies is three linear bodies.

4. The pavement drain according to claim 1, wherein the linear bodies have a diameter in a range of 1.0 to 10.0 mm.

5. The pavement drain according to claim 2, wherein the two linear bodies are connected together throughout side parts thereof to form the strap to have a substantially rectangular cross section.

6. The pavement drain according to claim 2, wherein the two linear bodies are connected together throughout side parts, the linear bodies having a substantially circular cross section.

7. A pavement drain comprising a spring coil strap formed in a continuous spiral fashion and composed of two linear bodies of synthetic resin that are arranged in parallel and connected together throughout side parts thereof such that the strap has a substantially rectangular cross section.

8. A pavement drain comprising a spring coil strap formed in a continuous spiral fashion and composed of two linear bodies of synthetic resin that are arranged in parallel and connected together throughout side parts, the linear bodies having a substantially circular cross section.

* * * * *